April 16, 1929.  E. K. STANDISH  1,709,816
LUBRICATING APPARATUS
Original Filed Jan. 4, 1922   2 Sheets-Sheet 1

Inventor:
Edward K. Standish
by Emery, Booth, Janney & Varney
Attys

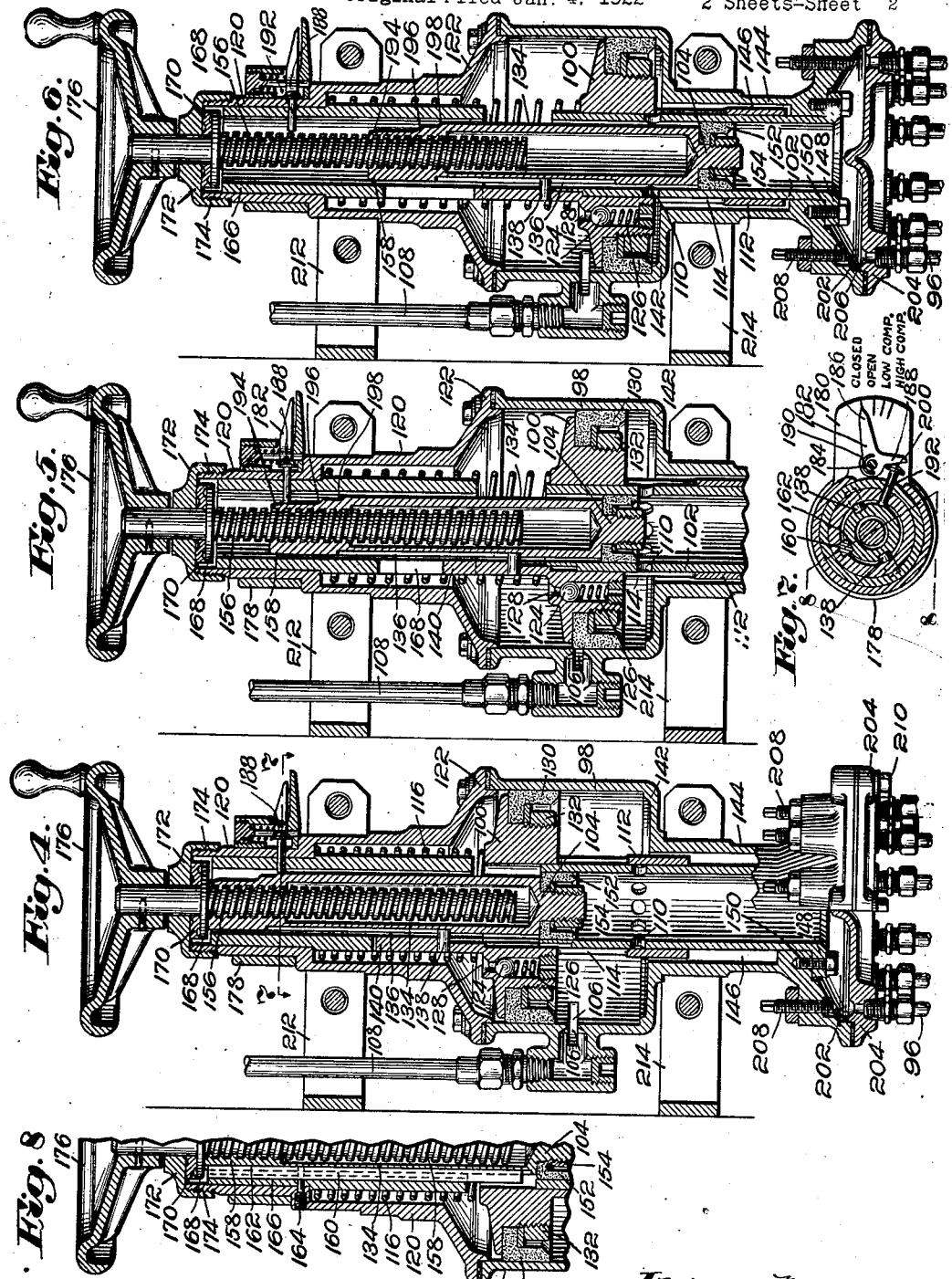

Patented Apr. 16, 1929.

1,709,816

UNITED STATES PATENT OFFICE.

EDWARD K. STANDISH, OF HARTFORD, CONNECTICUT, ASSIGNOR, BY MESNE ASSIGNMENTS, TO FREDERICK C. BLANCHARD, OF DORCHESTER, BOSTON, MASSACHUSETTS.

LUBRICATING APPARATUS.

Application filed January 4, 1922, Serial No. 526,896. Renewed May 11, 1927.

My invention aims to provide a novel and improved apparatus for lubricating various bearings of a machine, such as spring bolts, shackles, king-pins, and other minor bearings of a motor car chassis. The invention will be best understood by reference to the following description, when taken in connection with the accompanying drawings of one specific embodiment thereof, while its scope will be more particularly pointed out in the appended claims.

In the drawings:

Fig. 4 is a vertical sectional view of the pumping apparatus viewed in the same direction as Fig. 1;

Fig. 5 is a sectional view similar to Fig. 4, but with the parts shown in the relative positions which they occupy while the lubricant is being subjected to a light pressure;

Fig. 6 is a sectional view similar to Fig. 5, but showing the parts advanced still farther to a position in which the lubricant is subjected to a heavy pressure;

Fig. 7 is a sectional view on line 7—7 of Fig. 4; and

Fig. 8 is a partial section on line 8—8 of Fig. 7.

Figure 1:
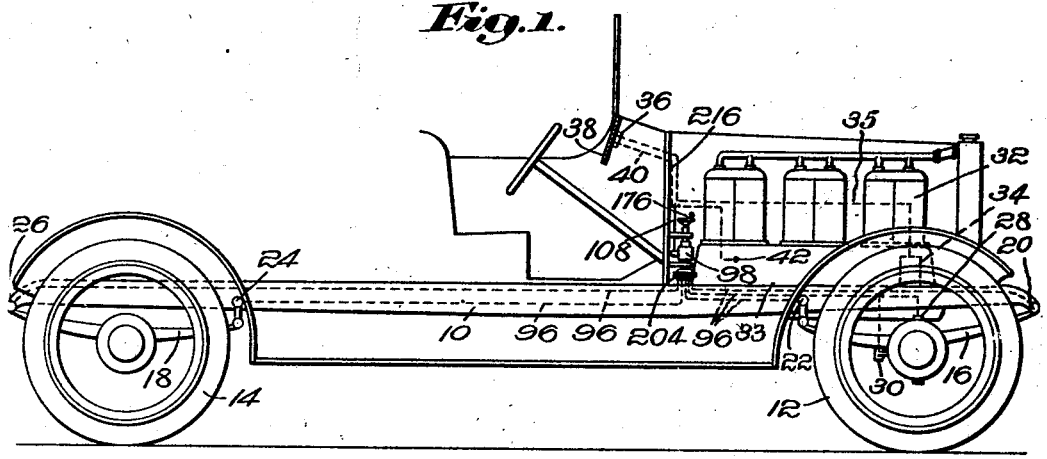
Fig. 1 is a side elevation of a motor car chassis, having a lubricating apparatus exemplifying the invention.
Figure 2:
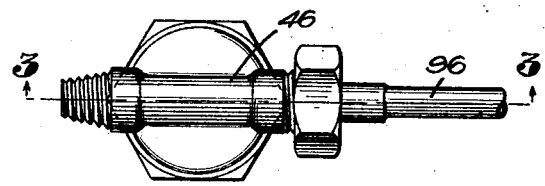
Fig. 2 is a plan of one of the terminals or oil cups.

Referring first to Fig. 1 of the drawings, I have shown as an example of a machine to which my invention may be applied a motor car chassis which may be of any usual construction, having a frame 10, front and rear wheels 12 and 14, front and rear springs 16 and 18, and various minor bearings including spring bolts 20, 22, 24 and 26, as well as king-pins 28 for the steering knuckles, and pivots 30 for the usual cross-rod which connects the customary steering knuckles.

The vehicle is propelled by a usual engine 32, having a crank-case 33, which presents a reservoir for the lubricant supplied to the various working parts of the engine, there being provided for this purpose a usual circulating pump conventionally represented at 34, from which an oil lead 35 extends to a usual indicator such as a sight-feed, conventionally represented at 36, mounted on an instrument board 38. A return pipe 40 from the sight feed discharges at a suitable point into the crank-case, as at 42. The parts thus far described are, or may be, of any usual or suitable construction.

Figure 3:
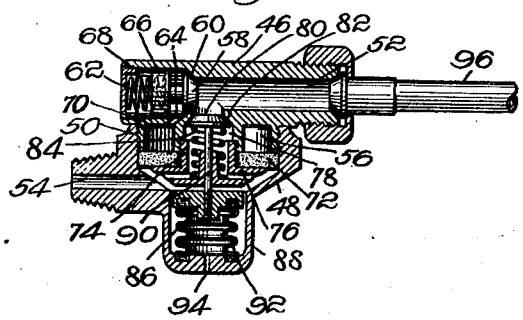
Fig. 3 is a sectional view on line 3—3 of Fig. 2.

The oil cups or terminals used at the various minor bearings of the chassis will now be described, reference being had to Fig. 3. Each of the oil cups or terminals comprises a casing which, for convenience of manufacture and assembly, includes upper and lower parts 46 and 48 secured to each other as by a screw-thread 50. The casing presents an inlet passage 52 adapted to be connected to the source of supply, and an outlet passage 54 adapted to be connected to the bearing which is to be lubricated. The casing also presents a chamber 56, affording a reservoir which it will be convenient to refer to as an auxiliary reservoir, because it receives oil from the crank-case 34, which serves as a main reservoir. This auxiliary reservoir is intended to be supplied with oil from time to time, and to feed the oil slowly to the bearing with which it is connected. The introduction of the oil into the reservoir is accomplished by the use of a valve 58, which cooperates with a seat 60, and when opened by the pressure of the oil in opposition to a suitable spring 62, permits the oil to flow from the inlet passage 52 through a small passage 64 into the reservoir. The valve carries at its rear end a piston 66, having a snug working fit in a cylinder 68. A vent port 70, leading from the cylinder 68 to the reservoir rearwardly beyond the piston, prevents air from being trapped behind the latter. When, therefore, the pressure of the lubricant in the inlet passage 52 rises sufficiently to overcome the opposition presented by the spring, the valve opens, and the auxiliary reservoir fills with oil. When the reservoir is filled, the oil rises through the passage 70, filling the chamber behind the piston, and closes the valve.

The oil thus supplied to the reservoir is suitably fed to the bearing, as by the provision of a permeable barrier 72, herein a porous, felt disk having its perimeter snugly fitted into the casing, and presenting a central opening which receives a bushing 74 threaded into the upper part of the casing, and having a depending head 76 affording a support for the felt disk.

It is desirable at times to supersede the normal slow feed of oil by a relatively greater amount, conducted to the bearing without passing through the reservoir, thereby to flood the latter, and to flush out any obstructions or accumulations of dirt or lubricant, more or less solidified, which might otherwise interfere with the normal feeding of oil to the bearing surfaces. To this end, I have provided a passage 78 formed partly in the upper part of the casing and partly in the bushing, and affording a direct communication between the inlet passage 52 and the outlet passage 54. This communication is controlled by a valve 80 cooperating with a valve seat 82, against which the valve seats in an upward direction under the influence of a spring 84. The strength of this spring is relatively greater than that of the spring 62, which seats the valve 60. When, therefore, lubricant under comparatively light pressure is supplied to the inlet passage 52, the valve 80 remains closed, but the valve 60 opens and admits lubricant to the reservoir. When, on the other hand, a relatively high pressure is produced in the passage 52, the valve 80 opens and permits oil to be supplied to the bearing at a considerable pressure, thereby flooding the latter and clearing it of any obstructions.

If the bearing presents no abnormal obstruction to the flow of lubricant, the latter would be wasted, were it not for the provision of means to cause the valve 80 to be shut. To the end, therefore, that such waste may be avoided, I have provided means responsive to the pressure outwardly beyond the valve 80 to cause the latter to be closed when the pressure drops below a predetermined amount. For this purpose, I have herein provided a piston 86, working in a cylinder 88 and connected to the valve 80, as by a stem 90; but to avoid the necessity of having the piston work snugly in its cylinder, I have provided a metallic bellows 92, having its upper end secured and sealed, as by soldering to the piston, and its lower end similarly secured and sealed to the lower part of the casing, the latter having a vent opening 94, affording communication between the interior of the bellows and the outer atmosphere. If the bearing is clogged and therefore presents an abnormal obstruction to the flow of lubricant, pressure is built up in the passages outwardly beyond the valve 80, and the latter remains open until the pressure removes the obstruction, whereupon the pressure will drop and will be insufficient to hold the valve open against the upward pressure exerted by the spring 84.

The oil cups receive their supply through the conduits 96 from the main reservoir, under the control of pumping instrumentalities now to be described, reference being had at first to Fig 4. In the present example, there are two pumps, the one providing a low pressure, and the other a relatively high pressure, said pumps having a common source of supply and a common outlet, one pump receiving its supply through the other. The low-pressure pump comprises a cylinder 98, in which a piston 100 is mounted to reciprocate, and the high-pressure pump comprises a cylinder 102, in which a piston 104 is mounted to reciprocate. As herein shown, the two pumps are coaxially arranged, one within the other. The low-pressure cylinder is provided with a lateral inlet port 106, which is connected by a conduit 108 with the return pipe 40, which leads back to the engine crank-case (see Fig. 1). The low-pressure cylinder is therefore constantly supplied with oil from the crank-case at a low pressure, usually little if any greater than that caused by the hydrostatic head.

The high-pressure cylinder receives it supply of oil from the low-pressure cylinder through one or more, herein a plurality, of lateral ports 110 provided in the high-pressure cylinder, and controlled by an encircling sleeve valve 112 depending from and carried by the low-pressure piston 100, said sleeve having elongated ports 114 adapted to move into and out of registration with the ports 110 when the low-pressure piston is lowered and raised. The relative location of the ports is such that in the initial position of the parts shown in Fig. 4, with the low-pressure piston elevated to its fullest extent, the ports 114 are out of registration with the ports 110, and the sleeve 112 closes the ports 110.

The low-pressure piston, in its elevated position, is above the lateral inlet port 106, through which the oil enters the low-pressure cylinder. When, however, the low-pressure piston is caused to descend, as soon as it passes the lateral inlet port 106, the low-pressure cylinder is cut off from the source of supply and the oil trapped therein is subjected to a low-pressure, herein furnished by a helically coiled spring 116 having its lower end resting against the piston and its upper end against an abutment 118 presented by a casing 120 constituting an upward prolongation of an upper cylinder head 122. An upwardly seating check-valve 124 seated by a spring 126 controls a passage 128 through the low-pressure piston. This check-valve is adapted to open when the piston ascends, and to close when it descends, thereby allowing any oil or air trapped in the upper end of the cylinder to pass through the piston to the under side thereof during the upward stroke of the piston. The piston is herein provided with a cupped leather washer 130, suitably secured thereto as by a nut 132.

The low-pressure piston is controlled in its movements by the high-pressure piston, and the operation of the two pumps is thereby coordinated. To this end, the high-pressure piston is provided with a upwardly elongated sleeve 134, presenting one or more, herein two, vertical slots 136, which receive pins or keys 138 projecting inwardly through vertical tongues 140 constituting upward prolongations of the low-pressure piston 100. The spring 116 is put in place under initial tension, and therefore constantly tends to urge the pins 138 against the lower ends of the slots 136. When, therefore, the high-pressure piston 104 is elevated, the low-pressure piston 100 is carried positively in an upward direction; but on the other hand, when the high-pressure piston is lowered, the low-pressure piston is caused to descend by gravity, assisted by the spring 116, at a speed determined by the descent of the high-pressure piston. It follows that, during the descent of the low-pressure piston, oil is forced from the low-pressure cylinder into the high-pressure cylinder as soon as the ports 114 and 110 register with each other, as will be evident from an examination of Fig. 5. This pressure is sufficient to cause the opening of the valve 58 (see Fig. 3), and to fill the auxiliary reservoir, but it is insufficient to cause the valve 80 to be opened for the flushing of the bearing.

When the low-pressure piston reaches the position represented in Fig. 6, it is stopped by bringing up against a lower cylinder head 142 having a downward prolongation 144, chambered out as at 146 to receive the sleeve 112. To this downward prolongation the high-pressure cylinder 102 is suitably secured, as by providing the same with an outwardly directed annular flange 148 secured thereto as by cap-screws 150. When the low-pressure piston has reached the end of its downward travel, continued movement of the high-pressure piston 104 causes the same to pass the ports 110, whereupon the oil in the high-pressure cylinder is subjected to a pressure determined by the force which moves the high-pressure piston. That force, naturally, must be great enough to overcome the resistance presented by the spring 84 (see Fig. 3), and is provided by suitable mechanism presently to be described. The high-pressure piston is herein provided with a suitable cupped leather washer 152, suitably secured thereto as by a nut 154.

As herein shown, the high-pressure piston is actuated by a vertically disposed screw 156, and nut 158, the latter being herein formed as an integral part of the sleeve 134, which it will be remembered is an upward prolongation of the high-pressure piston 104. Referring now to Fig. 8, the sleeve 134, in which the nut 158 is formed, is held against rotative movement by a key 160 received in a keyway 162 provided in said sleeve. This key is held in fixed position by a screw 164, which also holds in fixed position a sleeve 166. The latter, in turn, holds the low-pressure piston 100 against rotation by providing the sleeve with longitudinal slots 168 (one of which is well shown in Fig. 5), which receive the tongues 140, which it will be remembered constitute upward prolongations of the low-pressure piston. It is desirable that the low-pressure piston shall be held against rotation as just described, as otherwise the ports 110 and 114 might not remain properly aligned for registration.

Axial movement of the screw 156 is suitably prevented by providing the same with a laterally projecting flange or collar 168 interposed between the upper end of the sleeve 166 and a thrust washer 170, which is held in place by a cap 172 having screw-threaded engagement with the casing 120, as at 174. When, therefore, the screw is rotated, the nut is caused to ascend or descend, according to the direction of rotation of the screw, and the high-pressure piston is correspondingly raised or lowered in its cylinder. By this means, I am enabled to produce a pressure ample to clear any bearings which may have become clogged. The rotation of the screw may be effected by appropriate means, herein a hand-wheel 176 secured to the upper end of the screw.

The condition of the pumps may be shown by a suitable indicator, the construction and mode of operation of which will now be described, reference being had to Figs. 5 and 6. Surrounding the upper portion of the casing 120 is a collar 178, presenting a graduated scale 180 (see Fig. 7), as well as providing support for a lever 182 mounted on a pivot 184 and presenting a pointer 186 cooperating with said scale. In practice, these graduations will be marked with the words "Closed," "Open," "Low-compression" and "High-compression;" but, for the sake of clearness in the drawings, these words are not shown on the scale itself, but at one side thereof. The word "Closed" is intended to indicate the relative positions of the parts shown in Fig. 4, wherein the ports 110 and 114 are out of registration; the word "Open" is intended to indicate that position in which the ports 110 and 114 are in registration with each other, but before the low-compression piston has descended beyond the laterally disposed inlet port 106; the words "Low compression" are intended to indicate the condition of affairs represented in Fig. 5, after the low-compression piston has passed the lateral inlet port, and before the high-compression piston has started to descend; and the words "High compression" are intended to indicate the fact that the high compression piston has descended beyond the ports 110.

The actuation of the lever 182 to indicate these various positions is conveniently accomplished by providing it with an arm 188, yieldingly held by a helical torsional spring 190 against the outer end of a pin 192 whose inner end is adapted for cooperation with what may be likened to a cam or series of cams formed on the adjacent side of the vertically sliding sleeve 134 (see Fig. 5). To this end, the sleeve is herein provided with a succession of inclined surfaces 194, 196 and 198, properly located with respect to the length of the sleeve 134 to cause the indicator hand to indicate the successive positions of the pumps. By reference to Fig. 6, it will be observed that when the sleeve 134 descends beyond the pin 192, inward movement of the latter is limited by a head 200 on the outer end of the pin, which head brings up against the outer surface of the casing 120.

The lower end of the high-pressure cylinder 102 is in open communication with the chamber 202 presented by the lower part of the downward prolongation 144 of the cylinder head 142, and this chamber is closed at the bottom by a distributing head 204, which presents a plurality of outlets 206 connected to the several oil cups by the conduits 96. The size of these outlets may be varied by the use of valves presented by adjustable screws 208 arranged above the respective outlets. The distributing head is secured to the body of the casing as by screws 210 (see Fig. 4).

The pumping apparatus as thus described may be located at any convenient point, such as within the hood of the motor vehicle, and it may be supported by any appropriate means, such as upper and lower clamping brackets 212 and 214 embracing the upper and lower portions of the pump casing, and secured to any convenient support, such as a dashboard or cowl 216 (see Fig. 1).

The general operation of the apparatus should be evident from the foregoing description, but may be summarized briefly as follows:

While the engine is running, oil is constantly supplied to the pump inlet pipe. Assuming the oil cups to be empty and the bearings dry, the hand wheel 176 should be rotated in the proper direction to cause the descent of the pistons. As soon as the low-pressure piston has descended to the "open" position hereinbefore described, oil will gravitate from the source of supply through the low and high-pressure cylinders and the connections to the valve in the oil cups. Further rotation of the hand wheel brings the parts to the "low compression" position hereinbefore described, and the oil in the various feed lines is subjected to a low pressure sufficient, however, to open the valves leading to the auxiliary reservoirs, and thereby permitting the latter to be filled. Still further movement of the hand wheel causes the travel of the parts to the "high compression" position hereinbefore described, and there is produced in the feed lines leading to the oil cups a high pressure sufficient to open the outlet valves of such terminals as present abnormal obstructions, thus affording a direct communication with these particular bearings, thereby flooding the latter and causing the removal of any abnormal obstructions. Finally, the hand wheel is rotated in the reverse direction until the pump parts are restored to their initial positions.

Replenishment of the auxiliary reservoirs from time to time may be accomplished by simply rotating the hand wheel to bring the indicator to the low compression position; but it is not necessary to continue to the high compression position to flush the bearings, unless this is particularly desired. The hand wheel is then rotated in the reverse direction to restore the parts to their initial positions.

Having thus described one embodiment of my invention, but without limiting myself thereto, what I claim and desire by Letters Patent to secure is:

1. In a lubricating apparatus, the combination of two pumps, each having a cylinder and a piston working therein, said pumps having a common source of supply, one pump receiving its supply through the other and having an outlet serving for both; and means for causing the coordinated operation of said pumps.

2. In a lubricating apparatus, the combination of two pumps, each having a cylinder and a piston working therein, said pumps having a common source of supply, one pump receiving its supply through the other and having an outlet serving for both; means for opening and closing communication between said cylinders; and means for causing the coordinated operation of said pumps.

3. In a lubricating apparatus, the combination of two pumps, each having a cylinder and a piston working therein, said pumps having a common source of supply, one pump receiving its supply through the other and having an outlet serving for both; means consequent upon movement of one piston in its cylinder to open and close communication between said cylinders; and means to cause said pistons to move first in unison, followed by cessation of the movement of one and the continued movement of the other.

4. In a lubricating apparatus, the combination of two pumps, each having a cylinder and a piston working therein, said pumps having a common source of supply, one pump receiving its supply through the other and having an outlet serving for both; means to cause said pistons to move first in unison, followed by cessation of the movement of one and the continued movement of the other; and means to cause communication between said cylinders during said movement in unison and subsequently to cause such communication to be cut off.

5. In a lubricating apparatus, the combination of two pumps, each having a cylinder and a piston working therein, said pumps having a common source of supply, one pump receiving its supply through the other and having an outlet serving for both; means to cause said pistons to move first in unison, followed by cessation of the movement of one and the continued movement of the other; and means to cause communication between said cylinders during said movement in unison and to cause said continued movement to be accompanied by closing such communication.

6. In a lubricating apparatus, the combination of two pumps, each having a cylinder and a piston working therein, said pumps having a common inlet and a common outlet, one pump receiving its supply through the other; and means carried by one of said pistons for opening and closing communication between said cylinders.

7. In a pump structure, the combination of an outer cylinder having a piston working therein and having a lateral inlet which is opened and closed by said piston in its working stroke; an inner cylinder having a piston working therein and having a lateral inlet which is opened and closed by such piston during its working stroke and which inlet is adapted to afford communication between said cylinders; and means to cause said outer piston to pass the lateral inlet of said outer cylinder and subsequently to cause said inner piston to pass the lateral inlet of said inner cylinder.

8. In a pump structure, the combination of an outer cylinder having a piston working therein and having a lateral inlet which is opened and closed by said piston in its working stroke; an inner cylinder having a piston working therein and having a lateral inlet which is opened and closed by such piston during its working stroke and which inlet is adapted to afford communication between said cylinders; a valve carried by said outer piston and initially closing such communication; and means first to cause said valve to open such communication, then to cause said outer piston to pass the lateral inlet of said outer cylinder, and finally to cause said inner piston to pass the lateral inlet of said inner cylinder.

9. In a pump structure, the combination of two cylinders, each having a piston working therein; a spring tending to move one piston lengthwise of its cylinder; and means connecting said pistons to cause movement of the second piston to permit movement of the first piston under the influence of said spring, and subsequently to permit the first piston to stop and the second piston to continue its movement.

10. In a pump structure, the combination of two cylinders, each having a piston working therein; a spring tending to move one piston lengthwise of its cylinder, a key carried by one of said pistons, and a keyway carried by the other piston, cooperating to cause movement of one piston to permit movement of the other under the influence of said spring, and subsequently to permit the movement of the one piston to continue when the other is stopped.

11. In a lubricating apparatus, the combination of a source of supply; a feed line; means to open and close communication between said source and said feed line; and when such communication is closed, to subject the lubricant in said feed line to a pressure; means to subject the lubricant in said feed line to a relatively higher pressure; and an indicator to indicate whether such communication is open or closed and whether the lubricant is under low or high pressure.

12. In a pump structure, the combination of pumping means; an element having a rectilinear movement which operates said means, and which presents a lengthwise series of lateral steps; and an indicator operated by said steps to indicate the lengthwise positions of said element.

In testimony whereof, I have signed my name to this specification.

EDWARD K. STANDISH.